US005715476A

United States Patent [19]
Kundu et al.

[11] Patent Number: 5,715,476
[45] Date of Patent: Feb. 3, 1998

[54] METHOD AND APPARATUS FOR CONTROLLING LINEAR AND TOGGLE MODE BURST ACCESS SEQUENCES USING TOGGLE MODE INCREMENT LOGIC

[75] Inventors: Aniruddha Kundu, Hillsboro, Oreg.; Narendra Khandekar, Folsom, Calif.

[73] Assignee: Intel Corporation, Santa Clara, Calif.

[21] Appl. No.: 580,748

[22] Filed: Dec. 29, 1995

[51] Int. Cl.$^6$ .................................................. G06F 15/40
[52] U.S. Cl. .............................................................. 395/855
[58] Field of Search .................................. 395/821, 825, 395/834, 405, 427, 454, 855, 309, 401, 800; 365/189.01, 189.04, 230.03, 230.04, 230.09, 233, 238.5, 239

[56] References Cited

U.S. PATENT DOCUMENTS

| | | | |
|---|---|---|---|
| 4,908,789 | 3/1990 | Blokkum et al. | 395/497.03 |
| 5,040,153 | 8/1991 | Fung et al. | 365/230.03 |
| 5,134,699 | 7/1992 | Aria et al. | 395/855 |
| 5,175,835 | 12/1992 | Beighe et al. | 395/421.02 |
| 5,237,672 | 8/1993 | Ing-Simmons et al. | 395/421.02 |
| 5,269,010 | 12/1993 | MacDonald | 395/405 |
| 5,276,843 | 1/1994 | Tillinghast et al. | 395/432 |
| 5,301,278 | 4/1994 | Bowater et al. | 395/405 |
| 5,307,320 | 4/1994 | Farrer et al. | 365/230.01 |
| 5,379,384 | 1/1995 | Solomon | 395/308 |
| 5,386,385 | 1/1995 | Stephens, Jr. | 365/189.05 |
| 5,390,149 | 2/1995 | Vogley et al. | 365/189.01 |
| 5,392,239 | 2/1995 | Margulis et al. | 365/189.01 |
| 5,426,606 | 6/1995 | Takai | 365/189.05 |
| 5,444,667 | 8/1995 | Obara | 365/233 |
| 5,448,528 | 9/1995 | Nagai | 365/233 |
| 5,450,364 | 9/1995 | Stephens, Jr. et al. | 365/222 |
| 5,453,957 | 9/1995 | Norris et al. | 365/230.04 |
| 5,469,398 | 11/1995 | Scott et al. | 365/73 |
| 5,479,636 | 12/1995 | Vanka et al. | 395/460 |
| 5,481,581 | 1/1996 | Jonas, Jr. | 377/55 |

(List continued on next page.)

OTHER PUBLICATIONS

"Synchronous DRAMS Clock at 100 MHz", by Bursky, Dave, Electronic Design, v41, n4, p. 45(4), Feb. 18, 1993.
"Inside the PCI Local Bus", by Guy Kendall, Byte, Feb. 1994, p. 177; vol. 19, No. 2.
"Configurations for Solid State Memories," JEDEC Standard No. 21-C, Release 6, Jan. 1996, Electronic Industries Association Engineering Department.
"16Mbit Synchronous DRAM", NEC Corporation, Mar. 31, 1994.
"Single Chip PCI Bridge And Memory Controller For PowerPC™ Microprocessors," Michael J. Garcia, Brian K. Reynolds, Motorola Incorporated, 1993 IEEE, pp. 409–412.

(List continued on next page.)

Primary Examiner—Moustafa M. Meky
Attorney, Agent, or Firm—Cynthia Thomas Faatz

[57] ABSTRACT

Memory access control logic for controlling sequential and toggle mode burst accesses to a memory in a computer system using toggle mode automatic increment logic. The memory access control logic of the invention controls the sequence in which locations of a memory are accessed during a memory burst access operation wherein the burst access sequence is determined by an order in which a burst access starting address is incremented. Toggle increment logic for incrementing a starting address in a toggle sequence is included in the computer system in which the memory access control logic of the invention is used. An input bus receives a burst access request and a burst access starting address indicating a first memory location to be accessed in response to the burst access request from a device in the computer system. Additional logic determines whether the device requires a linear increment sequence or a toggle increment sequence for the burst access. Control logic controls the toggle increment logic to increment the starting address in a linear sequence in response to determining that the first device requires a linear increment sequence.

25 Claims, 5 Drawing Sheets

U.S. PATENT DOCUMENTS

| | | | |
|---|---|---|---|
| 5,498,990 | 3/1996 | Leung et al. | 365/189.06 |
| 5,522,050 | 5/1996 | Amini et al. | 395/306 |
| 5,524,235 | 6/1996 | Larson et al. | 395/478 |
| 5,526,320 | 6/1996 | Zagar et al. | 365/233.5 |
| 5,528,764 | 6/1996 | Heil | 395/293 |
| 5,535,343 | 7/1996 | Verseput | 395/308 |
| 5,539,693 | 7/1996 | Koshikawa et al. | 365/189.05 |
| 5,539,696 | 7/1996 | Patel | 365/189 |
| 5,550,710 | 8/1996 | Rahamim et al. | 361/687 |
| 5,598,378 | 1/1997 | Merritt et al. | 367/56 |
| 5,652,724 | 7/1997 | Manning | 365/189.05 |

OTHER PUBLICATIONS

"A New Era of Fast Dynamic RAMs," Fred Jones, United Memories, Inc., IEEE Spectrum Oct. 1992, pp. 43–45 and 48–49.

"16–Mb Synchronous DRAM with 125/MByte/s Data Rate," Yunho Choi, Myungho Kim, et al., IEEE Journal of Solid–State Circuits, vol. 29, No. 4, Apr. 1994, pp. 529–533.

| STARTING ADDRESS | LINEAR INCREMENT SEQUENCE | TOGGLE INCREMENT SEQUENCE |
|---|---|---|
| 0 | 0, 1 | 0, 1 |
| 1 | 1, 0 | 1, 0 |

FIG. 3A

| STARTING ADDRESS | LINEAR INCREMENT SEQUENCE | TOGGLE INCREMENT SEQUENCE |
|---|---|---|
| 0 | 0, 1, 2, 3 | 0, 1, 2, 3 |
| 1 | 1, 2, 3, 0 | 1, 0, 3, 2 |
| 2 | 2, 3, 0, 1 | 2, 3, 0, 1 |
| 3 | 3, 0, 1, 2 | 3, 2, 1, 0 |

FIG. 3B

| STARTING ADDRESS | LINEAR INCREMENT SEQUENCE | TOGGLE INCREMENT SEQUENCE |
|---|---|---|
| 0 | 0, 1, 2, 3, 4, 5, 6, 7 | 0, 1, 2, 3, 4, 5, 6, 7 |
| 1 | 1, 2, 3, 4, 5, 6, 7, 0 | 1, 0, 3, 2, 5, 4, 7, 6 |
| 2 | 2, 3, 4, 5, 6, 7, 0, 1 | 2, 3, 0, 1, 6, 7, 4, 5 |
| 3 | 3, 4, 5, 6, 7, 0, 1, 2 | 3, 2, 1, 0, 7, 6, 5, 4 |
| 4 | 4, 5, 6, 7, 0, 1, 2, 3 | 4, 5, 6, 7, 0, 1, 2, 3 |
| 5 | 5, 6, 7, 0, 1, 2, 3, 4 | 5, 4, 7, 6, 1, 0, 3, 2 |
| 6 | 6, 7, 0, 1, 2, 3, 4, 5 | 6, 7, 4, 5, 2, 3, 0, 1 |
| 7 | 7, 0, 1, 2, 3, 4, 5, 6 | 7, 6, 5, 4, 3, 2, 1, 0 |

FIG. 3C

METHOD AND APPARATUS FOR CONTROLLING LINEAR AND TOGGLE MODE BURST ACCESS SEQUENCES USING TOGGLE MODE INCREMENT LOGIC

BACKGROUND OF THE INVENTION

1. Field of the Invention

The present invention relates to the field of computer systems. Specifically, the present invention relates to improving memory subsystem performance for burst memory accesses in a computer system.

2. Description of Related Art

In some computer systems, memory devices or other types of devices including memories may be accessed by particular devices using a burst mode access. Burst mode accesses generally provide for multiple data units (bits, bytes, words, or quadwords for example) to be read from or written to the memory using one memory access command, thus decreasing memory access latencies. In some cases, a burst access is performed when a single memory access instruction, such as a burst READ or a burst WRITE, is received by the memory device along with a sequence of addresses to be accessed.

Some memory devices or devices including a memory array have an automatic address increment mechanism to generate the addresses of the memory locations to be accessed during a burst access. In this case, the burst access command from a requesting device need only include a starting address indicating a memory location at which the burst access is to begin. The automatic increment mechanism then increments the least significant bits of the starting address in a particular sequence to generate the addresses of the remaining memory locations to be accessed during the burst access. The number of subsequent memory addresses generated by this automatic increment logic and the order in which they are accessed is determined in some cases by a burst length indicator and a burst sequence indicator stored in a register by the computer system manufacturer, or during operation or configuration of the computer system to indicate the number of data items to be accessed during a burst access.

An example of a device which is currently available and includes an automatic address increment mechanism is a synchronous dynamic random access memory (SDRAM) device. Different types of integrated circuit devices as well as different bus protocols are optimized for or require different burst address increment sequences. SDRAMs include a programmable mode register which provides for either linear (also referred to as sequential), or interleaved (also referred to as toggle mode) burst memory accesses. The linear or sequential increment sequence increments an address in sequential order to linearly access the number of data items indicated by the burst length set in a register or hardwired in the computer system. For example, given a starting address of 1001 (binary) and a burst length of four data items, a linear address increment sequence would increment the starting address to access memory locations 1010, 1011 and 1100 in that order.

The toggle address increment sequence is referred to as a toggle sequence because the sequence is such that the value of the least significant bit toggles from a value of "0" to a value of "1". Thus, the sequence may be sequential in some cases, but in many cases, the toggle sequence is non-sequential or non-linear. Using the same example, given a starting address of 1001 and a burst length of four data items, a toggle address increment sequence would increment the starting address to access memory locations 1000, 1011, and 1010 in that order.

To switch between the address increment modes, however, the SDRAM mode register must be reprogrammed each time a different type of address increment sequence (sequential or toggle mode) is required. The SDRAM mode register is programmable on the fly and thus can accommodate changing address increment requirements, however the delay incurred each time the address increment mode is changed is significant.

For example, in a particular computer system including a high performance processor on a host bus, and other agents on a peripheral bus such as a PCI bus, all burst accesses to the main memory from the host bus may require an interleaved memory address increment sequence, and all burst access requests from the PCI bus may require a sequential memory address increment sequence. In this case, the mode register of the SDRAM must be reprogrammed frequently to provide the correct memory address increment sequence control depending on the source of a burst access request.

This programming and re-programming of the SDRAM mode register can consume a significant number of clock cycles, especially where memory access requests switch continuously between processor and PCI memory accesses. For example, some SDRAMs require two clock cycles to program the mode register, and two idle clock cycles following programming of the mode register before another memory access request may be processed. Thus, a four clock cycle penalty is incurred each time the SDRAM mode register is re-programmed to provide a different address increment sequence for a burst access. Other devices which include both sequential and non-sequential automatic address increment modes are subject to the same issues.

Thus, it is desirable to provide a means for automatically incrementing the memory address for a burst access to meet the requirements for both sequential and toggle mode burst accesses, without incurring the clock cycle penalty associated with re-programming automatic increment control logic of the memory device.

SUMMARY OF THE INVENTION

A method and apparatus for controlling sequential and toggle mode burst access operations to a memory in a computer system using toggle mode automatic increment logic is described. The invention controls the order in which locations of the memory are accessed during a memory burst access operation wherein the burst access sequence is determined by an order in which a burst access starting address is incremented. The computer system includes toggle increment logic for incrementing the starting address in a toggle sequence. The memory access control logic of the invention includes an input bus for receiving a burst access request from a first device and the burst access starting address indicating a first memory location to be accessed in response to the burst access request. The memory access control logic of the invention also includes logic for determining whether the first device requires a linear or a toggle increment sequence for the burst access operation, and control logic for controlling the toggle increment logic to increment the starting address in a linear sequence in response to determining that the first device requires a linear increment sequence.

BRIEF DESCRIPTION OF THE DRAWINGS

FIG. 3A is a table illustrating an example of sequential and interleaved increment sequences for a burst length of two data items.

FIG. 3B is a table illustrating an example of sequential and interleaved increment sequences for a burst length of four data items.

FIG. 3C is a table illustrating an example of sequential and interleaved increment sequences for a burst length of eight data items.

DETAILED DESCRIPTION OF THE INVENTION

The invention provides memory access control logic for controlling sequential and toggle mode burst access sequences using toggle automatic address increment logic. In the following description, numerous specific details are set forth in order to provide a thorough understanding of the invention. However, it will be appreciated by those skilled in the art that the invention may be practiced without these specific details. In other instances, well-known elements have not been described in detail in order to avoid obscuring the invention.

Overview of the Computer System of One Embodiment

Figure 1:
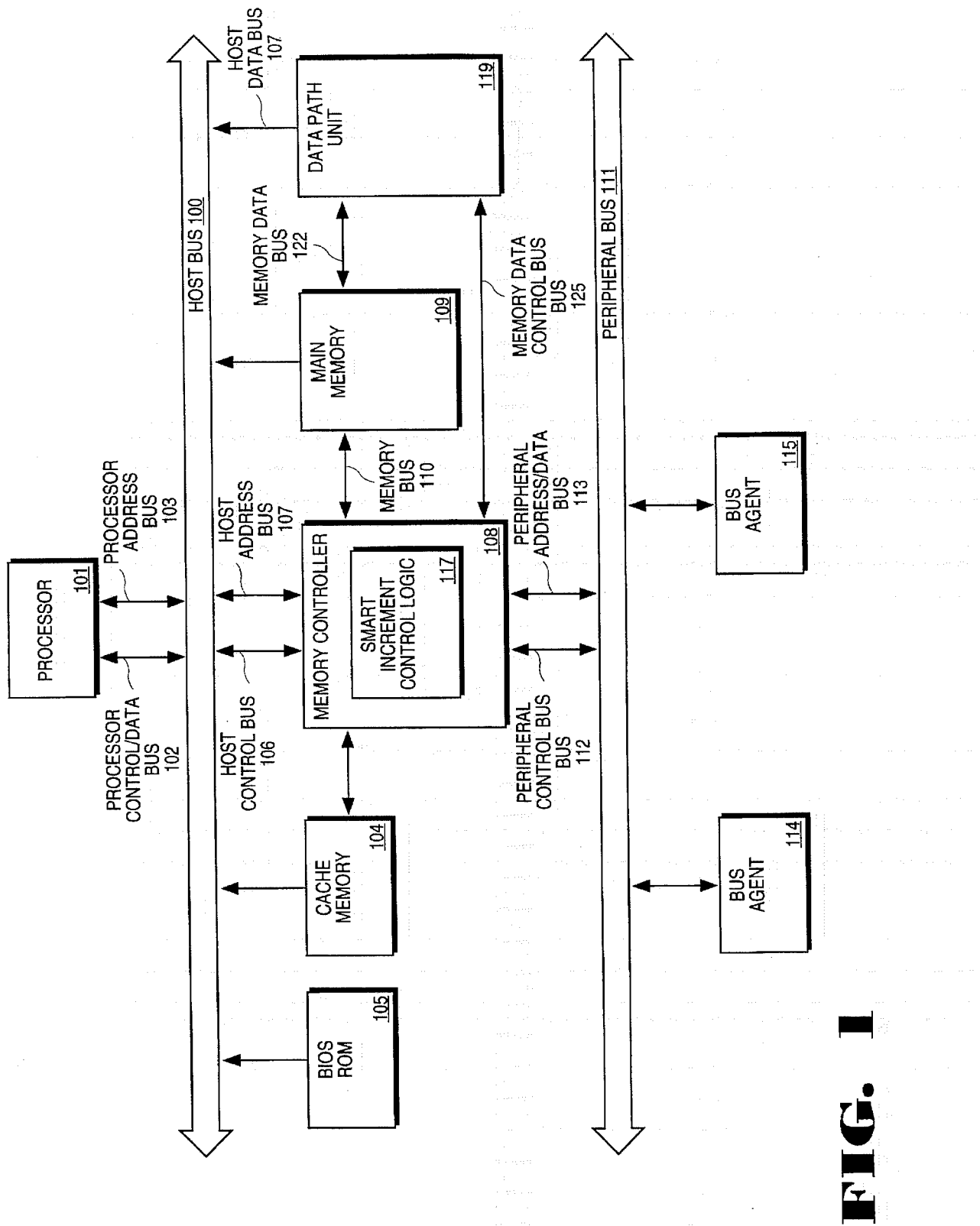
FIG. 1 is a high level block diagram illustrating a computer system in accordance with one embodiment of the invention.

FIG. 1 is a block diagram illustrating a computer system in accordance with one embodiment of the invention. The computer system of the invention comprises a host bus 100 for communicating information, a processor 101 for processing information and a cache memory 104 for storing frequently and/or recently used information for the processor 101. The processor 101 is coupled to the host bus 100 via a processor control and data bus 102 and a processor address bus 103. In one embodiment, the processor 101 is an Intel Architecture Microprocessor such as is manufactured by Intel Corporation of Santa Clara, Calif., the corporate assignee of the invention, however, other processor architectures may also be used in accordance with the invention. The cache memory 104 may be configured within the same integrated circuit device package as the processor 101 or within a separate integrated circuit device package.

The computer system of one embodiment also includes a read-only memory (ROM) 105, or other non-volatile storage device, for storing fixed information and instructions for the processor 101. The ROM 105 of one embodiment stores a basic input/output system (BIOS) program for initializing and configuring the computer system upon start-up or reset of the computer system.

Also coupled to the host bus 100 via a host control bus 106 and a host address bus 107 is a memory controller 108 for controlling accesses (such as memory READ and WRITE operations), as well as memory refresh operations, to a main memory 109. The main memory 109 stores information and instructions for the processor 101 during operation of the computer system and is coupled to the memory controller 108 via a memory bus 110 which includes both memory address and memory control signal lines. The memory controller 108 of one embodiment is also coupled to a peripheral bus 111 such as a Peripheral Component Interconnect (PCI) bus via peripheral control bus 112 and peripheral address and data bus 113. The memory controller 108 includes bus bridge logic (not shown) for communicating between the host bus 100 and the peripheral bus 111 in one embodiment. In alternate embodiments, the bus bridge logic may not be included in the memory controller 108, or may be in a separate integrated circuit device.

The memory controller 108 controls accesses to the main memory 109 in response to memory access requests from agents on the host bus, such as the processor 101, or the peripheral bus 111. Agents on either bus which are capable of performing burst accesses to and from the main memory 109 or other memory device in the computer may require or be optimized for burst accesses using a particular memory address increment sequence. In one example, it is necessary to increment the starting address of a burst access request from the processor 101 in a toggle mode to generate the addresses of memory locations to be accessed during the burst access operation. Similarly, all memory burst access requests originating from agents on the peripheral bus 111 in one example, require the memory address for the access to be incremented in a linear increment sequence for subsequent data items accessed during a burst access operation. Examples of linear and toggle mode address increment sequences which may be utilized to control such burst accesses are described in more detail below in reference to FIGS. 3A, 3B, and 3C.

The memory controller 108 of one embodiment includes smart increment control logic 117 which operates to control the address increment sequence during a burst access to the main memory 109. The smart increment control logic of the invention controls toggle increment mode logic on a memory or on a device including a memory to provide a particular increment sequence as determined by the type of increment sequence required (toggle or linear), the starting address provided with the burst access request, and the burst length (the number of data items to be retrieved during the burst access) set in the memory controller 108 or other logic within the computer system. The smart increment control logic 117 of the invention accomplishes this using the toggle increment mode logic without having to reprogram a mode register or other such logic to switch back and forth between linear and toggle increment modes. In this manner, the smart increment control logic of the invention helps to reduce or eliminate the delay incurred when changing address increment modes. The operation of the smart increment control logic 117 is described in more detail below with reference to FIGS. 2, 3 and 4.

Still referring to FIG. 1, in one embodiment, a data path unit 119 is also coupled to the host bus 100 via the host data bus 120, and to the main memory 109 via the memory data bus 122. The data path unit 119 of one embodiment receives control signals from the memory controller 108 over the memory data control bus 125. The data path unit 119 operates to control the flow of data to and from the main memory 109 in response to data access or transfer requests received by the memory controller 108. In this manner, the address and data flows associated with the main memory 109 are somewhat separated to provide for more efficient operation. In some embodiments, data to and from the main memory 109 is transferred to the host bus over the host data bus 120, however data to and from the main memory 109 is transferred to the peripheral bus 111 through the memory controller 108 and over peripheral address/data bus 113. The functionality of the memory controller 108 and the data path unit 119 are integrated into one integrated circuit component in some embodiments.

It is appreciated by those skilled in the art that other computer systems may also be used in accordance with the invention. Similarly, it is appreciated by those skilled in the art that the computer system illustrated in FIG. 1 may include additional components not illustrated in FIG. 1, or may be configured without components, such as the peripheral bus 111, that are illustrated in FIG. 1.

Memory Controller and Main Memory Arrangement of One Embodiment

Figure 2:
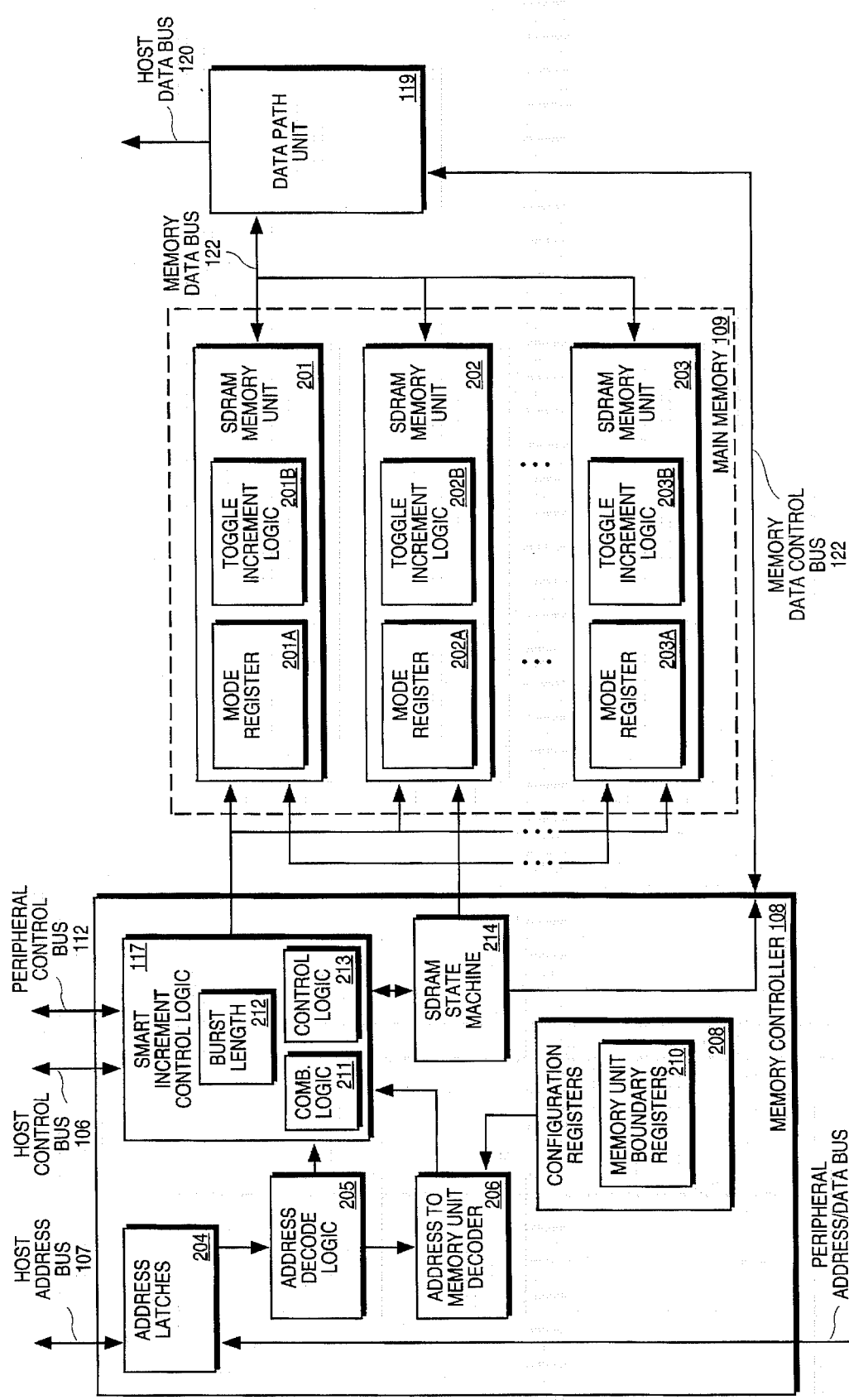
FIG. 2 is a block diagram illustrating the memory controller and main memory arrangement of one embodiment of the invention.

FIG. 2 illustrates the memory controller and main memory arrangement of one embodiment of the invention. Although the invention is described with reference to a main memory array including particular types and numbers of memory devices, it will be appreciated by those of ordinary skill in the art that other memory arrays including different types and numbers of memory devices may also be used in accordance with the invention.

The Main Memory Array

The main memory 109 of FIG. 2 includes memory units 201–203 which correspond to memory array rows in FIG. 2, but may be arranged differently in other embodiments. The memory units 201–203 are synchronous dynamic random access memory (SDRAM) devices in a dual in-line memory module (DIMM) configuration in one embodiment. Each of the SDRAM memory units 201–203 includes a corresponding mode register 201A–203A. The mode registers 201A–203A are programmable registers for controlling specific features related to the operation of each SDRAM memory unit 201–203. The mode registers 201A–203A are programmed to provide certain desired operating characteristics either during configuration of the computer system or on the fly during operation of the computer system as changes in operating characteristics are required.

The mode registers of one embodiment, such as the mode register 201A are 12 bits wide with bits 2:0 indicating the number of words that will be input or output in a burst READ or WRITE cycle, also referred to as the "burst length". The burst length of one type of SDRAM memory unit is programmable to 1, 2, 4, or 8 data words, or to burst a full page of memory. In one embodiment, bit 3 indicates the mode, either linear or toggle mode, in which the starting memory address is automatically incremented during a burst access sequence of 1, 2, 4, or 8 data words. In one embodiment, for a full page burst length, only a linear increment sequence is available. The toggle or interleaved address increment mode is often used by high performance processors for a faster cache line fill, for example. The toggle mode is used to alternate between banks of memory such that one bank can be accessed while the other is precharging and thus, less delay is incurred in processing the burst access.

The toggle increment mode is thus enabled by setting the appropriate bit in an SDRAM mode register such as mode registers 201A–203A in FIG. 2, in one embodiment. Programming an SDRAM mode register to provide a toggle increment sequence enables toggle increment logic 201B–203B on the particular SDRAM memory unit being accessed. The toggle increment logic 201B–203B increments a burst access starting address according to the toggle mode sequences, with the particular sequence being determined by the starting address provided with the burst access and the burst length set in the mode register or elsewhere in the computer system. The toggle sequences are described below with reference to FIGS. 3A, 3B, and 3C.

The difference between the linear and toggle increment sequences directed by the linear and toggle modes set in the mode register, is illustrated in FIGS. 3A, 3B, and 3C for burst lengths of 2, 4, and 8 data items respectively. For example, FIG. 3B shows the differences between the linear and toggle mode address increment sequences for a burst length of 4 data words. The column 301 indicates the value of the least significant two bits of the starting address provided with a burst access request, also referred to herein as the data item starting address. The numbers indicated throughout FIG. 3B are binary numbers, but are shown in decimal notation for ease of illustration and readability.

The particular toggle or linear increment sequence provided by the SDRAM increment control logic, for example, depends on the data item starting address determined by the value of a predetermined number of least significant bits of the starting address, wherein the specific number of bits is determined by the burst length. The column 302 shows the linear increment sequence of the two least significant bits for a burst access starting address having least significant bits with a value corresponding to the number indicated in column 301. Similarly, the toggle increment sequence of the two least significant address bits for a burst memory access with the corresponding data item starting address is shown in column 303. It should be noted that the linear and toggle increment sequences for data item starting addresses of 0 and 2 are identical in the case where the burst length is set to 4 words.

The linear and toggle increment sequences for a burst length of 2 words and a burst length of 8 words are similarly illustrated in FIGS. 3A and 3C respectively. As shown, the linear and toggle increment sequences for a burst length of 2 words are identical and thus, reprogramming of the mode register 201A is not required for different types of accesses requiring different increment modes. The linear and toggle mode automatic increment sequences for burst access starting addresses having least significant bits equal to 0 and 4 are also identical where the burst length is set to 8 words as shown in FIG. 3C.

The remaining bits of the mode register 201A are used to set the latency of a control signal referred to as the CAS# signal. The CAS# signal controls the availability of data, and the latency set in the mode register 201A controls how many clock cycles must elapse before the data from a data access operation will be available on the memory data bus 122 after an access operation is initiated. The value set for the CAS# latency is a function of the speed grade or access time of the SDRAM device and the clock frequency of the computer system clock. The operation of the CAS# signal and other SDRAM control signals are well-known to those of ordinary skill in the art and are readily available in data sheets from SDRAM manufacturers such as NEC Corporation.

As mentioned above, the mode registers 201A–203A may be configured during set-up or configuration of the computer system, or on the fly as needed when changes in operating conditions are required.

The Memory Controller of One Embodiment

Referring back to FIG. 2, the memory controller 108 of one embodiment is described in more detail. The smart increment control logic 117 includes combinatorial logic 211 and control logic 213 for controlling the toggle increment logic to provide both linear and toggle mode increment sequences as described in more detail below. Along with the smart increment control logic 117, the memory controller 108 includes address latches 204 for latching incoming addresses from the host address bus 107 and the peripheral address and data bus 113. In one embodiment, the address latches 204 provide for pipelining of memory access requests to increase throughput of the requests. Memory access instructions associated with the memory addresses received by the address latches 204 are received by the smart increment control logic 117 from the host control bus 106 and the peripheral control bus 112. Address decode logic 205 coupled to the address latches 204 decodes incoming addresses to determine whether associated instructions, such as memory access instructions, are destined for the main memory 109, the cache memory, or another computer system component.

Once the address decode logic 205 determines that an address associated with the access request is in the main memory 109, the address is decoded by an address-to-memory unit decoder 206 into row and column address components identifying the particular memory unit of memory units 201–203, and the precise location being accessed in the particular memory unit. The address-to-memory unit decoder 206 decodes incoming addresses to determine the memory location being accessed based in part on information stored in configuration registers 208 in the memory controller 108.

The configuration registers 208 include memory unit boundary registers 210. In one embodiment, a memory unit size determination routine is part of the BIOS stored in the BIOS ROM and executed on power-up or restart of the computer system. The size determination routine determines the storage capacity of each of the memory units in the main memory array and stores the information in the memory unit boundary registers 210 in the form of starting and ending addresses for each of the memory units in one embodiment. In an alternate embodiment, information is stored in the memory unit boundary registers 210 based on input provided by the computer system user, either via input to a configuration routine, or by setting hardware switches in the computer system. The configuration registers 208 may also include additional configuration registers storing different types of information which are not discussed herein.

Once the address of the incoming memory access request from either the host address bus 107 or the peripheral address and data bus 113 is decoded by the address-to-memory unit decoder 206, the address is forwarded to the smart increment control logic 117 of the invention. During non-burst access memory operations, the smart increment control logic 117 passes control of the operation on to the SDRAM state machine 214. The SDRAM state machine 214 operates to provide all of the required control signals for SDRAM memory operations to the SDRAM memory units 201–203 over the memory control bus 218. During burst accesses, the SDRAM state machine 214 operates in the same manner, however the operation of some of the control signals may be altered based on input from the smart increment control logic 117 as described in more detail below.

Addresses of the memory locations being accessed are transferred to the main memory array 109 over the memory address bus 216 during both burst and non-burst memory access operations. Data is transferred to and from the main memory over the memory data bus 122, through the data path unit 119. In one embodiment, data is transferred to and from the processor over the host data bus 120 or to and from the peripheral bus through the memory controller 108 over the peripheral address and data bus 113. Transfer of data to and from the main memory is controlled by the memory controller 108 by control signals transmitted to the data path unit 119 over the memory data control bus 125.

The Smart Increment Control Logic of the Invention

During burst memory access operations, the smart increment control logic 117 of the invention assumes control of some of the memory access control signals to provide for automatic incrementing of a burst access starting address in cooperation with the toggle automatic increment control logic of the SDRAM memory units 201–203. In this manner, the smart increment control logic of the invention operates to control the sequence of a burst access to memory. As discussed above, the smart increment control logic 117 controls automatic incrementing of an address to provide both linear and toggle increment sequences using the toggle automatic increment mode of an SDRAM.

Along with the combinatorial logic 211 and the control logic 213 which operates as described below, the smart increment control logic 117 of one embodiment includes a register 212 for storing the burst length that is programmed into the mode registers 201A–203A during configuration of the computer system in one embodiment. Based on the burst length stored in the register 212, the data item starting address determined from an incoming burst access request, and the requirements of the device or bus from which the request originated, the smart increment control logic operates to determine and control the correct address increment sequence for a burst access to the main memory 109.

The smart increment control logic 117 of the invention determines whether to use the available toggle mode address increment sequence indicated by the value of the predetermined number of least significant bits or to control switching between one or more toggle mode increment sequences to duplicate a required linear increment sequence in response to a particular burst access request received by the memory controller 108. In one embodiment, the determination of whether to use a toggle or linear increment sequence is based on the source of the burst access request, but may be determined in another manner in other embodiments. For example, certain devices may include a code accompanying the burst access request or encoded within the request indicating whether the particular device requires a linear or toggle mode address increment sequence for a burst access. It should be noted that the word "requires" in reference to the burst access increment sequence may not necessarily be an architectural requirement of the device, but is also used to indicate a higher performance operating condition, or a constraint imposed by the computer system designer.

The operation of the smart increment control logic 117 of the invention is described herein using a burst length of 4 data words as an example. It will be appreciated by those of ordinary skill in the art that the smart increment logic of the invention also operates with larger and smaller burst lengths. Further, while the burst length is described in the context of data words for the purposes of description, other sizes of data units, such as memory bits, bytes and pages, may also be transferred in a burst access and controlled by the smart increment control logic 117 of the invention.

Figure 4:
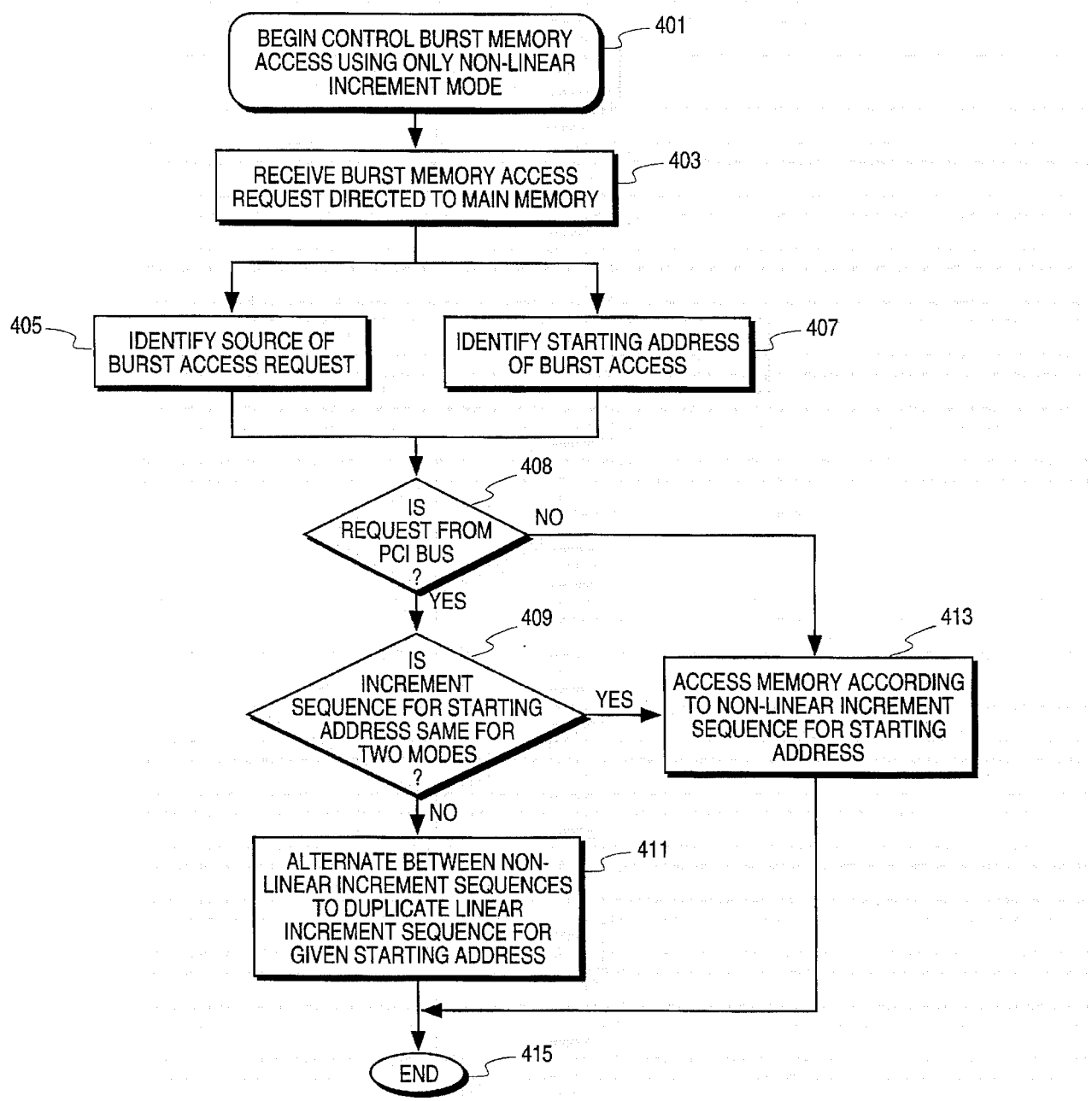
FIG. 4 is a flow diagram illustrating the method of one embodiment of the invention.

The operation of one embodiment of the smart increment control logic 117 is illustrated in block diagram form in FIG. 4. For purposes of illustration, it is assumed in this example that all main memory access requests originating from the peripheral bus, a PCI bus in this example, require the memory address to be incremented in a linear manner for a burst memory access. Further, in this example, all memory access requests originating from the processor 101 or the host bus require that the memory address is incremented in a toggle or non-linear fashion for a burst memory access. Thus, in the embodiment illustrated in FIG. 4, the required address increment sequence is determined by the source of the burst access request, in this case the host bus or the peripheral bus from which the burst access request is received.

The method of one embodiment of the invention for controlling burst memory accesses using only a non-linear or toggle memory address increment mode begins at step 401. In step 403, a main memory burst access request is received by the memory controller. Then, in parallel in one embodiment, the source of the burst access request is identified in step 405 and the data item starting address of the burst access request is identified in step 407. The data item starting address is the value indicated by a predetermined number of least significant bits of the starting address for the burst access provided along with the burst access request. The predetermined number is based on the burst length set in the SDRAM mode register and the smart increment control logic.

In decision block 408, it is determined whether the memory access request originated from the PCI bus. If so, then at step 413, the burst memory access begins and is executed in accordance with the non-linear increment mode programmed into the SDRAM mode registers of the main memory. The method then ends at step 415.

Referring back to decision block 408, if the request is not from the PCI bus, then in step 409, based on the starting address identified in step 407, the smart increment control logic of the invention determines whether the linear and non-linear increment sequences for that particular starting address are the same. If so, then in step 413, the burst access is executed according to the non-linear or toggle address increment mode controlled by the particular SDRAM memory unit being accessed in the main memory. If, at decision block 408 the linear and toggle mode increment sequences are not the same for that particular address, then in step 411, the smart increment logic controls the memory address increment sequence by alternating between particular non-linear increment sequences corresponding to different data item starting addresses to duplicate the desired linear increment sequence. The smart increment control logic of the invention does this by manipulating the starting address using the combinatorial logic and also by controlling the memory access control signal using the control logic 213. In this manner, data in memory locations can be ignored if necessary to duplicate the linear access sequence. The method then ends at step 415.

A more specific example of the operation of the smart increment logic of the invention is described with reference to FIGS. 2, 3 and 5. In this example, the burst length in both the SDRAM mode registers and the smart increment control logic has been set to 4 words. The linear and toggle increment sequences are the same as those discussed with reference to FIG. 3B.

Figure 5:
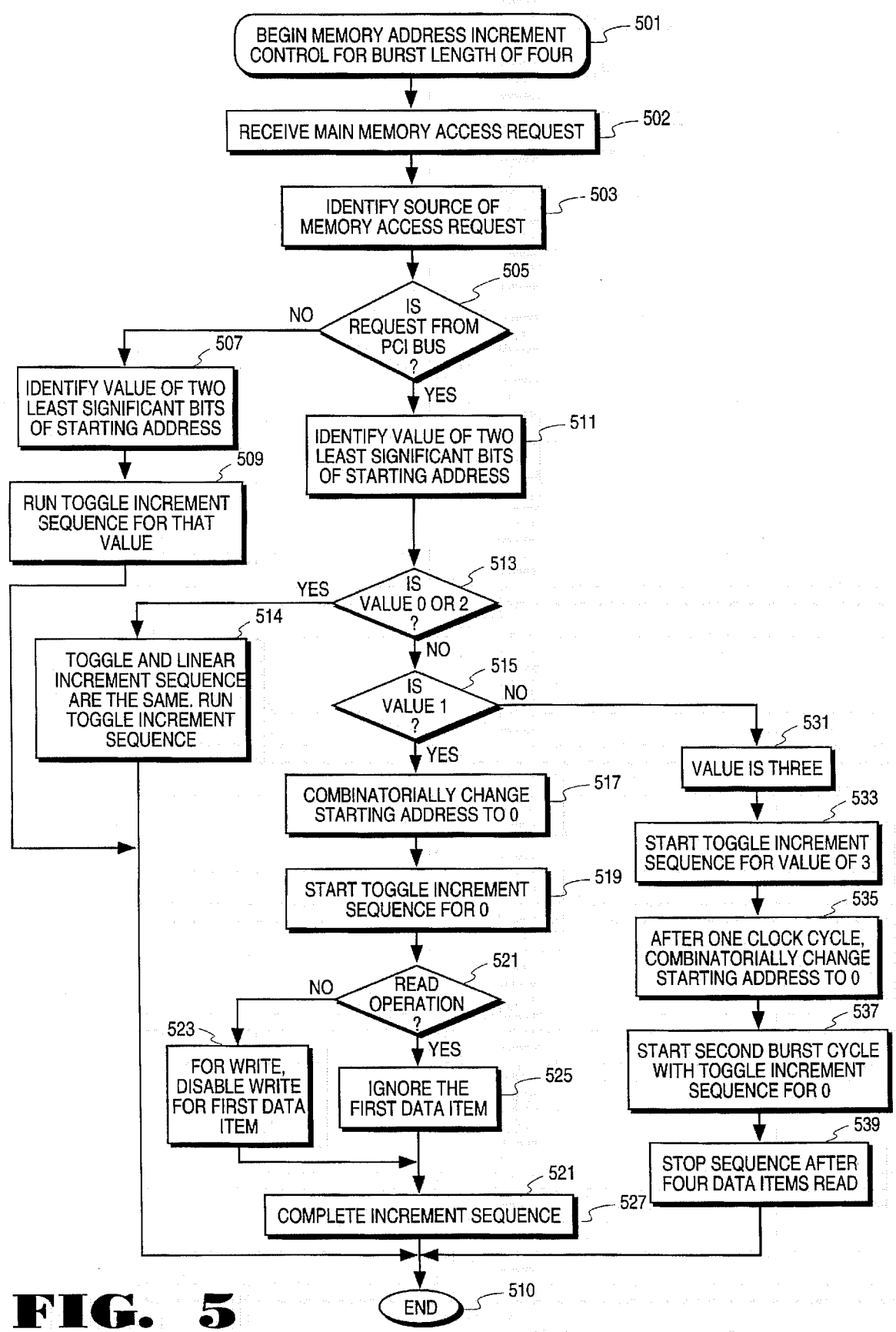
FIG. 5 is a flow diagram illustrating the method of one embodiment of the invention for a burst length of four data words.

Referring to FIG. 5, the memory address increment control operation for a burst length of four data words begins at step 501. A memory access request is received by the memory controller 108 from either the host control bus 106 or the peripheral control bus 112 at step 502 along with a burst access starting address on the corresponding address bus-either the host address bus 107 or the peripheral address/data bus 113. In this embodiment, the source of the request is identified by the bus from which the request was received at step 503. In other embodiment the required increment sequence may be determined in another manner.

At decision block 505, if the burst access request did not originate from the peripheral bus 111, a PCI bus in this example, then in this example, a toggle increment sequence is required. At step 507, the value of the two least significant address bits of the starting address is determined indicating the data item starting address. In this case, the data item starting address is determined using the two least significant bits because the burst length is set to four data words. The two least significant bits of the starting address thus uniquely define one of four data words as a starting point for the burst access with the remainder of the starting address indicating the particular cache line, for example, assuming that the burst length of four words is chosen to correspond to the length of a cache memory or other memory line. Once the data item starting address has been determined, then in step 509, the toggle increment sequence for that data item starting address is executed and the burst access sequence ends at step 510.

Referring back to decision block 505, if the burst access request is from the PCI bus (the peripheral bus 111), then in step 511, the value of the two least significant bits of the starting address, or the data item starting address is determined in step 511. At decision block 513, if the data item starting address is 0 or 2, the toggle and linear increment sequences are the same as is illustrated in FIG. 3B. Then, in step 514, the particular toggle increment sequence corresponding to the data item starting address is used to control the burst access, and the sequence ends at step 510. In this manner, no delay is incurred for a burst access initiated by an agent on the peripheral bus as would be seen if the mode register of the SDRAM being accessed had to be reprogrammed to provide a linear increment sequence.

Referring back to decision block 513, if the value of the data item starting address is not 0 or 2, then in decision block 515, it is determined whether the value of the data item starting address is 1. If so, then at step 517, the data item starting address is combinatorially changed with the combinatorial logic to a data item starting address of 0 and at step 519, the corresponding toggle increment sequence is used to control the beginning of the burst access. In decision block 521, if the burst access operation is a READ operation, the first data item accessed by the burst access operation controlled by the toggle increment sequence for a data item starting address of 0, is ignored. In one embodiment, the first accessed data item is ignored by delaying the assertion of a control signal which indicates that valid data is on the peripheral address/data bus 113 in response to the burst access request using the control logic of the smart increment control mechanism to control the SDRAM state machine 214. In step 527, the burst access is completed according to the toggle increment sequence for a data item starting address of 0.

Referring back to decision block 521, if the operation is not a burst READ operation, then at step 523, for a burst WRITE access, the first data item is also ignored. In one embodiment, the data item is ignored by asserting a DQM signal of the SDRAM being accessed using the control logic of the smart increment logic, such that the first data item is not written to the particular SDRAM being accessed. Then in step 527, the burst access is completed under the control of the SDRAM toggle increment sequence for a data item starting address of 0 and the burst access ends at step 510. Thus, for a linear increment sequence with a data item starting address of 1, a one clock penalty is incurred as the first data item is ignored in one embodiment. This one clock penalty is much lower than the four clock cycles required to reprogram the SDRAM mode register to provide an automatic linear address increment sequence and wait until data can be transferred again. In this manner, the memory access performance for burst accesses is significantly improved.

Referring back to decision block 515, if the value of the data item starting address is not 1, then at step 531, the value of the data item starting address is 3. At step 533, the toggle increment sequence for a data item starting address of 3 is used to control the beginning of the burst access. At step 535, after one data item is accessed, another burst access cycle is started with a data item starting address of 0 by combinatorially changing the value of the two least significant bits and then controlled by the corresponding toggle increment sequence. Data items beyond the required burst length are ignored by asserting the correct control signals using the control logic depending on whether the access is a READ or a WRITE. The access then ends at step 510. In this case, a one clock penalty is incurred in one embodiment in starting the second burst access sequence. As above, this delay in processing the burst access request is lower than the four clock penalty incurred by reprogramming the SDRAM mode register to provide an automatic linear address increment sequence.

Along with the increased burst access efficiency provided by the invention as described above, the invention also offers the advantage of reducing test costs associated with SDRAMs. If only the toggle automatic address increment mode is used for burst accesses, testing of the SDRAM in the linear increment mode is not required. Further, silicon space in future versions of SDRAM devices can be saved by not having to include the control logic associated with the linear automatic address increment sequence.

Although the above method is described with reference to a burst length of 4 data words, it will be appreciated by those of skill in the art that the other burst lengths are within the scope of the invention. Whereas many alterations and modifications of the invention may occur to one of ordinary skill in the art after having read the foregoing description, it is to be understood that the particular embodiments shown and described by way of illustration are in no way intended to be considered limiting. Therefore, references to details of various embodiments are not intended to limit the scope of the claims which in themselves recite only those features regarded as essential to the invention.

What is claimed is:

1. An apparatus for controlling the order in which locations of a memory in a computer system are accessed during a burst access operation, the order being determined by a sequence in which a burst access starting address is incremented, the computer system including toggle increment logic to increment an address in a toggle sequence, the apparatus comprising:

an input bus to receive burst access requests and corresponding starting addresses from a plurality of devices in the computer system, each starting address indicating a first memory location to be accessed in response to the corresponding burst access request, each of the plurality of devices requiring either a linear or a toggle address increment sequence; and sequence control logic coupled to the input bus and to be coupled to the toggle increment logic to control the toggle increment logic to increment the starting address in a linear sequence in response to a burst access request from a device requiring a linear address increment sequence, the sequence control logic ignoring accesses to memory locations having addresses indicated by the toggle increment logic which are not included in the linear sequence.

2. The apparatus as set forth in claim 1 wherein the memory is a synchronous dynamic random access memory (SDRAM).

3. The apparatus as set forth in claim 2 wherein the toggle increment logic is configured on the SDRAM.

4. The apparatus as set forth in claim 3 wherein the SDRAM includes a mode register having a burst length field to store a burst length indicating a number of memory locations to be accessed during a burst access operation.

5. The apparatus as set forth in claim 4 wherein the toggle increment logic increments an address in one of a plurality of toggle address increment sequences, the particular toggle address increment sequence being selected by the burst length indicated in the mode register and a value of a predetermined number of least significant bits of the address to be incremented.

6. The apparatus as set forth in claim 5 wherein the required linear address increment sequence for a device requiring a linear address increment sequence during a burst access is determined by the burst length indicated in the mode register and a value of the predetermined number of least significant bits of the starting address corresponding to the burst access request from the device requiring a linear address increment sequence.

7. The apparatus as set forth in claim 1 further including logic for combinatorially changing a value of a predetermined number of least significant bits of the starting address to select one or more of a plurality of toggle address increment sequences to combine to to increment the starting address in the linear sequence.

8. The apparatus as set forth in claim 1 wherein the computer system includes a processor communicating with the memory over a host bus and one or more peripheral devices communicating with the memory on a peripheral component interconnect (PCI) bus, and wherein a linear access order is required for burst access requests from the devices coupled to the PCI bus and a toggle access order is required for burst access requests from the processor coupled to the host bus.

9. The apparatus as set forth in claim 1 wherein the sequence control logic further combines a plurality of toggle increment sequences to produce the linear sequence if the linear and toggle increment sequences corresponding to the starting address are different from each other.

10. A method for controlling the order in which locations of a memory in a computer system are accessed during a burst access operation, the order being either a linear order or a toggle order, the order being determined by a sequence in which a burst access starting address is incremented, the computer system including toggle increment logic for incrementing an address in a toggle sequence, the method comprising the steps of:

receiving a burst access request and a burst access starting address from a first device in the computer system, the starting address indicating a first memory location to be accessed during the burst access operation performed in response to the burst access request;

determining whether the first device requires a linear or a toggle address increment sequence for the burst access operation;

controlling the toggle increment logic by a sequence control logic to increment the starting address in a linear sequence if the first device is determined to require a linear burst access sequence; and ignoring an access to a particular memory location by the sequence control logic if the toggle increment logic increments the starting address to access the location and the location is not required to be accessed during the burst access operation.

11. The method as set forth in claim 10 wherein the memory is an SDRAM.

12. The method as set forth in claim 11 wherein the toggle increment logic is configured on the SDRAM.

13. The method as set forth in claim 12 wherein the SDRAM includes a mode register to store a burst length indicating a number of memory locations to be accessed during a burst access operation.

14. The method as set forth in claim 13 wherein the toggle increment logic increments an address in one of a plurality of toggle address increment sequences depending on the burst length indicated in the mode register and a value of a predetermined number of least significant bits of the address to be incremented.

15. The method as set forth in claim 14 wherein if the first device is determined to require a linear address increment sequence, the required linear address increment sequence is determined by the burst length and a value of the predetermined number of least significant bits of the starting address.

16. The method as set forth in claim 15 further including a step of combinatorially changing the value of the predetermined number of least significant bits of the starting address to select one or more of the plurality of toggle address increment sequences in order to duplicate the required linear address increment sequence.

17. The method as set forth in claim 15 wherein the burst length is four data words and the predetermined number of least significant bits determining the value is two.

18. The method as set forth in claim 10 wherein the computer system includes a processor communicating with the memory over a host bus and at least one peripheral device communicating with the memory on a PCI bus, and wherein the step of determining is responsive to a source of the burst access request to determine that the device requires a linear access order if the burst access request is received from the PCI bus and a toggle access order if the burst access request is received from the host bus.

19. The method as set forth in claim 10 wherein the step of controlling includes a step of combining a plurality of toggle increment sequences to produce the linear sequence if the linear and toggle increment sequences corresponding to the starting address are different from each other.

20. A computer system comprising:
   a processor;
   a host bus coupled to the processor for communicating information;
   a memory coupled to the host bus;
   a peripheral bus coupled to the memory;
   toggle increment logic coupled to the memory, the host bus and the peripheral bus to increment an address in a toggle increment sequence; and
   smart increment logic coupled to the memory to control the sequence of a burst access to the memory in response to a burst access request and a burst access starting address received from the host bus or the peripheral bus, the smart increment logic controlling the toggle increment logic to increment the burst access starting address in a linear increment sequence if the burst access request is received from the peripheral bus, the smart increment logic ignoring accesses indicated by addresses from the toggle increment logic which are not included in the linear sequence.

21. The computer system as set forth in claim 20 wherein the peripheral bus is a peripheral component enterconnect (PCI) bus.

22. The computer system as set forth in claim 20 wherein a particular toggle address increment sequence selected by the toggle increment logic is determined by a burst length set in a burst length register coupled to the memory and a value of a predetermined number of least significant bits of the burst access starting address.

23. The computer system as set forth in claim 22 further including combinatorial logic coupled to the toggle increment logic to combinatorially change the burst access starting address to select one or more toggle address increment sequences in order to produce the linear address increment sequence.

24. The computer system as set forth in claim 20 wherein the smart increment logic further combines a plurality of toggle increment sequences to produce the linear sequence if the linear and toggle increment sequences corresponding to the starting address are different from each other.

25. An apparatus for determining the addresses of memory locations to be accessed in response to linear and toggle memory burst access requests specifying a starting address while in a toggle increment mode, the apparatus comprising:
   toggle increment control logic to increment the starting address in one of a plurality of toggle sequences, the particular toggle sequence depending on the starting address, the toggle increment control logic operative in the toggle increment mode; and
   smart increment control logic coupled to control the toggle increment control logic to increment the starting address in a linear sequence while in the toggle increment mode in response to a linear burst access request, the smart increment control logic using a plurality of toggle increment sequences to produce a linear sequence if the linear and toggle increment sequences corresponding to the starting address are different, the smart increment control logic ignoring addresses indicated by a toggle sequence provided by the toggle increment control logic which are not included in the linear sequence.

* * * * *

UNITED STATES PATENT AND TRADEMARK OFFICE
CERTIFICATE OF CORRECTION

PATENT NO. : 5,715,476
DATED : February 3, 1998
INVENTOR(S) : Kundu et al.

It is certified that error appears in the above-identified patent and that said Letters Patent is hereby corrected as shown below:

In column 14 at line 7 delete "enterconnect" and insert --interconnect--

Signed and Sealed this

Twenty-first Day of July, 1998

Attest:

BRUCE LEHMAN

*Attesting Officer*    *Commissioner of Patents and Trademarks*